United States Patent
Gandhi (10) Patent No.: US 9,662,816 B2
(45) Date of Patent: May 30, 2017

(54) OVERMOULD FOR SEALING USING DOUBLE OVERMOULD

(75) Inventor: Dinesh Nataly Gandhi, Brampton (CA)

(73) Assignee: Psion Inc., Mississauga, Ontario (CA)

(*) Notice: Subject to any disclaimer, the term of this patent is extended or adjusted under 35 U.S.C. 154(b) by 1336 days.

(21) Appl. No.: 12/765,993

(22) Filed: Apr. 23, 2010

(65) Prior Publication Data
US 2011/0259902 A1    Oct. 27, 2011

(51) Int. Cl.
*B65D 90/00* (2006.01)
*B29C 45/16* (2006.01)
*B29K 21/00* (2006.01)

(52) U.S. Cl.
CPC ...... *B29C 45/1671* (2013.01); *B29K 2021/00* (2013.01)

(58) Field of Classification Search
USPC ....... 220/672, 605, 614, 628, 630, 632, 636, 220/646, DIG. 21; 206/701, 724, 305, 206/710; 345/173
See application file for complete search history.

(56) References Cited

U.S. PATENT DOCUMENTS

| | | | |
|---|---|---|---|
| 845,777 A * | 3/1907 | Grossman | 215/376 |
| 5,813,638 A * | 9/1998 | Morris | 248/152 |
| 7,726,621 B1 * | 6/2010 | Dellinger | 248/346.5 |
| 2006/0081635 A1 * | 4/2006 | Matsutori et al. | 220/378 |
| 2008/0217280 A1 * | 9/2008 | Dekker et al. | 215/6 |
| 2008/0251515 A1 * | 10/2008 | Baughman | 220/320 |
| 2009/0179412 A1 | 7/2009 | Gray et al. | |

OTHER PUBLICATIONS

Canadian Office Action for Canadian Patent Application No. 2737951 mailed Apr. 7, 2016.

* cited by examiner

*Primary Examiner* — Jeffrey Allen (57) ABSTRACT

A method of forming respective overmoulds to protect and seal an enclosure apparatus is provided. Respective separate overmoulds for external surfaces of the enclosure and for sealing a cavity or cavities defined by the enclosure may be formed in a single injection moulding tool in a single operation. An enclosure component and enclosure are also disclosed.

10 Claims, 7 Drawing Sheets

OVERMOULD FOR SEALING USING DOUBLE OVERMOULD

FIELD

The present disclosure relates to providing overmoulded components of an enclosure such as an enclosure for an electronic device, particularly a handheld electronic device.

BACKGROUND

Apparatus such as electronic devices comprise multiple components including an enclosure. The enclosure may be defined from one or more sub-components such as moulded hard plastics. At least for some electronic devices, components within a cavity defined by the enclosure are fragile or otherwise susceptible to breakage or malfunctioning following certain occurrences such as mechanical shock or contamination.

SUMMARY

Electronic devices such as handheld electronic devices are susceptible to dropping by users thereof. Particular product manufacturing or composition standards may require product assembly using materials that are more susceptible to breakdown by mechanical shock from dropping or bumping or excessive vibration than are other materials. Shock damage may be particularly acute when, for example, devices are manufactured to the Restriction of Hazardous Substances Directive (RoHS). RoHS mandates a limitation on the use of lead in certain devices. When used in soldering and other connections lead provides a less brittle material than substitutes and is thus less susceptible to shock or vibration. RoHS devices may be more vulnerable.

For some uses, electronic devices are exposed to harsh environmental conditions where fluid and non-fluid based contaminants may be present. Components within the enclosure may degrade or malfunction following contamination.

Overmoulding surface regions of an enclosure may provide shock and/or abrasion absorption properties to the electronic device. Overmoulding surface regions about an opening of a cavity of an enclosure may provide sealing properties. It is desirable to be able to manufacture electronic device enclosures efficiently and to effectively reduce wear, shock and contaminant breakdowns.

A method of forming respective overmoulds to protect and seal an enclosure is provided. Respective separate overmoulds for external surfaces of the enclosure and for sealing a cavity or cavities defined by the enclosure may be formed in a single injection moulding tool in a single operation.

There is provided a method of overmoulding a substrate comprising forming, on two or more surface regions of the substrate, two or more separate overmoulds, said two or more overmoulds formed using a single tool in a single operation without having to remove the substrate from the tool until the two or more overmoulds are formed.

At least two of the overmoulds may comprise different elastomers. One of the overmoulds may be a wear resistant and/or mechanical shock resistant overmould for an exterior surface of an enclosure at least partially defined by the substrate and another of the overmoulds may be a sealing overmould for a coupling surface defined by the substrate for assembly to another enclosure component.

The substrate may define an enclosure component of an enclosure and have at least one exterior surface and at least one interior surface at least partially defining a cavity having at least one opening to be sealed by at least one other component. One of the two or more overmoulds may comprise a first overmould for defining a covering for at least a portion of the exterior surface; and another one of the two or more overmoulds may comprises a second overmould for defining a seal between the at least one other component and at least one of the openings of the cavity.

In some cases, the respective elastomers of the first overmould and the second overmould have different physical properties. A hardness physical property of the first overmould may be greater than the hardness physical property of the second overmould. The hardness physical property of the first overmould and second overmould may respectively measure about 60 Shore A and about 40 Shore A.

At least one interior surface may defines a cavity having a first opening and a second opening, each opening to be sealed by a respective overmould. In some cases, the substrate may define a channel, wholly or partially enclosed by said substrate, between a first region about the first opening and a second region about the second opening through which channel an elastomer may be injected to form said second overmould.

The substrate may comprise a polycarbonate plastic material.

The method may comprise inserting the substrate into the tool and placing the tool in an injection moulding machine for forming the two or more overmoulds. The method may further comprise injecting a first elastomer into the tool to define a first overmould and injecting a second elastomer into the tool to define a second overmould. After injecting said first elastomer, the method may involve manipulating said tool having said substrate before injecting said second elastomer. Manipulating may comprise at least one of: rotating the tool; and heating and/or cooling the tool in accordance with a forming property of said first elastomer or second elastomer.

The substrate may define one of a plurality of enclosure components for assembly to define an enclosure for electronic components of an electronic device.

In another aspect there is provided an enclosure component comprising a substrate defining an external surface and a coupling surface for assembly to a component, the external surface having overmoulded thereto an external overmould comprising a first elastomeric material and the coupling surface having overmoulded thereto a sealing overmould comprising a second elastomeric material.

In a further aspect there is provided an enclosure comprising a plurality of enclosure components for assembly to define said enclosure, at least some of the enclosure components comprising a substrate defining an external surface and a coupling surface for assembly to a another of the enclosure components, the external surface having overmoulded thereto an external overmould comprising a first elastomeric material and the coupling surface having overmoulded thereto a sealing overmould comprising a second elastomeric material thereby to define a seal between two enclosure components.

BRIEF DESCRIPTION OF THE DRAWINGS

The disclosure will now be described by way of example only with reference to the following drawings in which.

DETAILED DESCRIPTION

Figure 1:
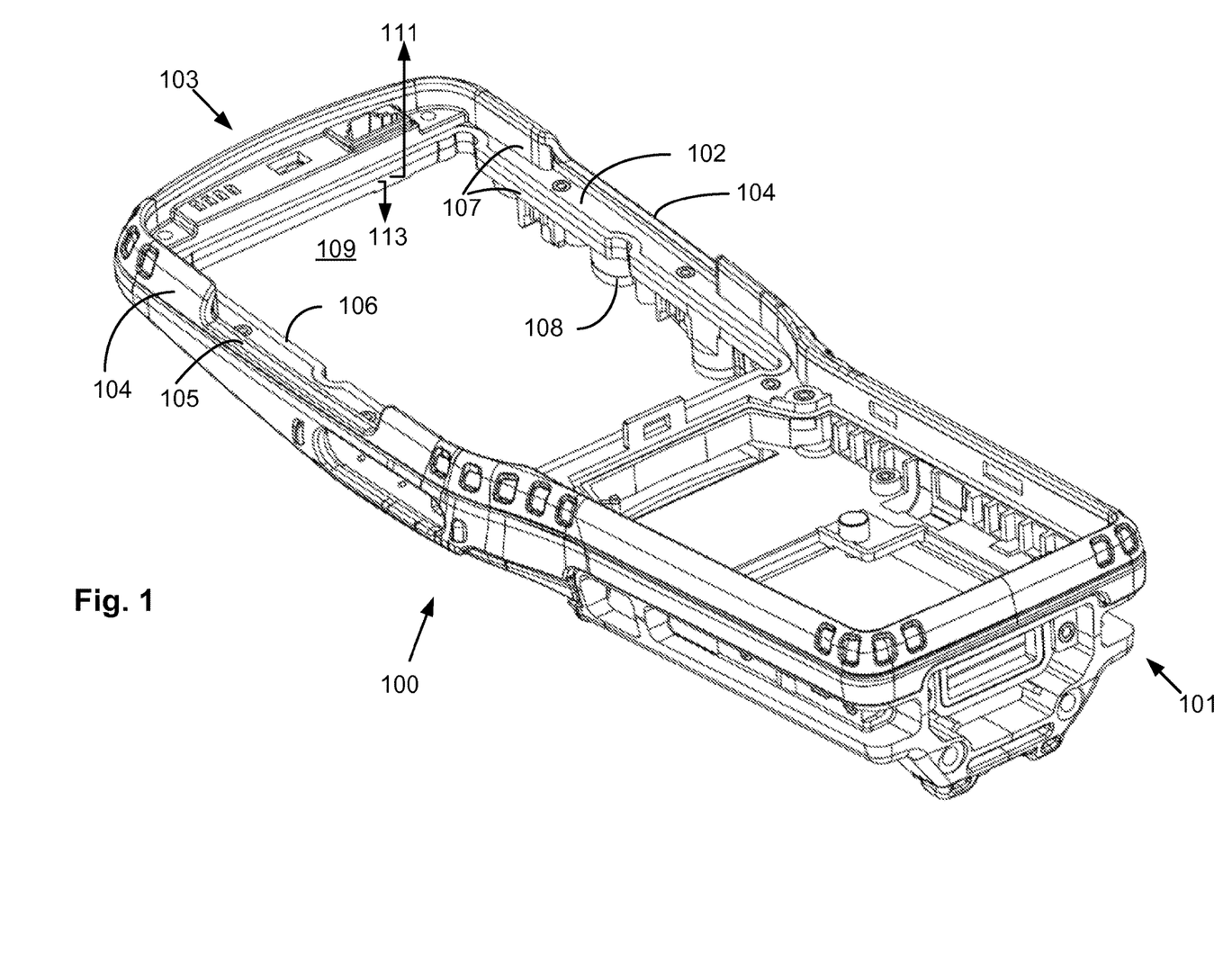
FIG. 1 is front perspective view from a bottom end to a top end of a portion of an enclosure for an electronic device.

FIG. 1 illustrates a front perspective view of a portion of an enclosure 100 from a bottom end 101 to a top end 103. The portion 100 comprises a substrate 102. Substrate 102 may comprise a hard plastic material such as polycarbonate (for example, Lexan™ EXL9134 from Sabic Innovative Plastics IP B.V.) which may be pre-formed by injection moulding. The enclosure may have one or more exterior surfaces (e.g. 105) defined by a surface of substrate 102. The exterior surface may have at least a partial region thereof covered by a first overmould 104. The enclosure may have one or more interior surfaces (e.g. 107) defined by a surface of substrate 102. The enclosure may define one or more cavities (e.g. cavity 109) for enclosing components of an electronic device (not shown).

Cavity 109 comprises a top opening (generally denoted as 111) and a bottom opening (generally denoted as 113). In some embodiments a cavity may have only one opening or more than two openings. The enclosure may be further defined by additional components such as a cover or partial cover (see partial cover 500 of FIG. 5 for opening 113) for an opening in the enclosure. A cover portion for opening 111 is not shown.

An overmoulded seal (e.g. 106, 108) may be located about a coupling surface defining a periphery of at least one of the openings for the cavity defined by the substrate for sealing enclosure components when coupled such as substrate 102 and a cover therefor. Though shown on the substrate 102, in other configurations, a person of skill in the art will appreciate that a seal may be overmoulded to a portion of a cover for engaging with a cooperating portion of the substrate 102.

It will be apparent that a one of the overmoulds is a wear and shock resistant overmould for an exterior surface of the enclosure at least partially defined by the substrate 102 and another of the overmoulds is a sealing overmould for a coupling surface of the substrate for assembly to another enclosure component, for example, for covering at least a portion of a cavity of the enclosure defined by the substrate.

In accordance with desired properties for the respective exterior overmould and the sealing overmould, the types of overmoulds may comprise respective different materials, such as different (thermoplastic) elastomers (TPE). In one embodiment, the different elastomers may comprise GLS Corporation's Versollan™ OM 1262NX for the external overmould and GLS Corporation's Versaflex™ OM 1040X for the sealing overmould. The overmould resin may be chosen such that it chemically bonds to the substrate— eliminating the need to mechanically lock the overmould to the substrate or the need for adhesives.

Respective overmould materials may be selected for use in accordance with their different physical properties. For example, a hardness physical property of the first overmould for an external surface may be greater than the hardness physical property of the second overmould sealing a cavity. The harder material may resist wear and abrasion. The softer material may provide a tightly engaging seal.

In one embodiment, the hardness physical property of the first overmould and second overmould respectively measure about 55-65 Shore A and about 40 to 50 Shore A. In this way, as shown more clearly in FIGS. 6B and 6C, a rib portion of an enclosure component such as a cover may be received by slightly deforming the second (sealing) overmould so as to tightly fit to the rib.

The substrate thus defines a component of an enclosure having at least one exterior surface (105) and at least one interior surface (107) and at least partially defining a cavity (109) having at least one opening (111, 113) to be sealed by at least one other component (500) of the enclosure. A one of the two or more overmoulds (e.g. 104) comprises a first overmould for defining a covering for at least a portion of the exterior surface. Another one (106 or 108) of the two or more overmoulds comprises a second overmould for defining a seal between the substrate and at least one other component (not shown or 500) of the enclosure.

Figure 2:
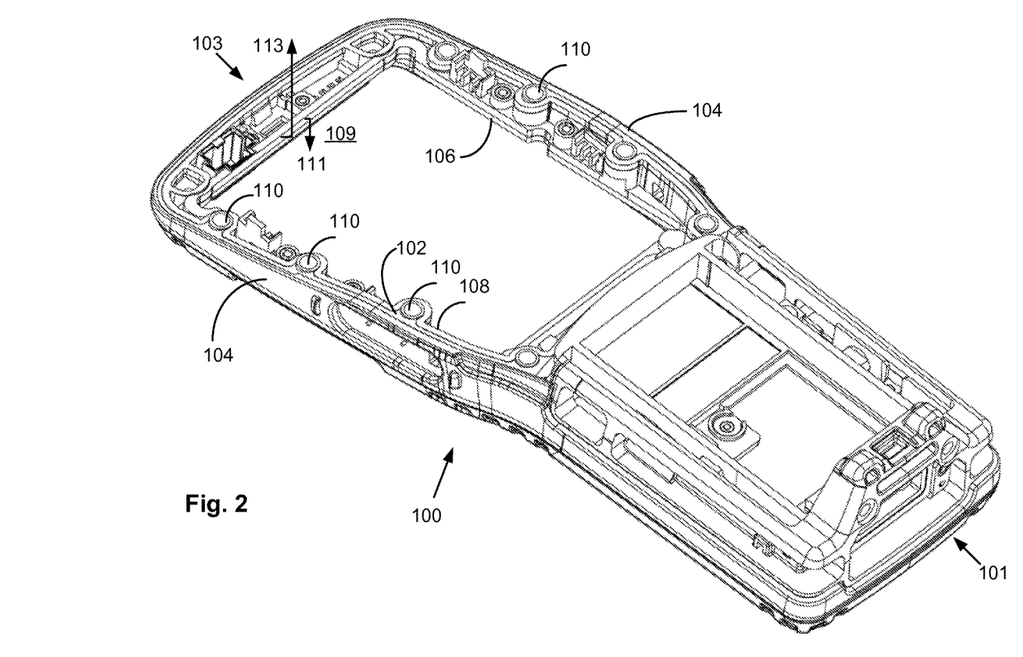
FIG. 2 is back perspective view of the portion of enclosure for an electronic device of FIG. 1.

FIG. 2 is a back perspective view of the portion 100 from a bottom end 101 to top end 103. FIG. 2 illustrates a plurality of screw bosses (e.g. 110) defined by substrate 102 about the coupling surface for accepting a threaded fastener to securely (but removably) fasten cover 500 about opening 113 in accordance with the present embodiment. In other embodiments, components of an enclosure may be removably fastened using other manners such as snap or friction fit techniques (not shown). Overmould 108 may be configured to skirt bosses 110 as well as other structures to conform to a complex peripheral shape of the substrate coupling surface (e.g. cavity opening).

Figure 3:
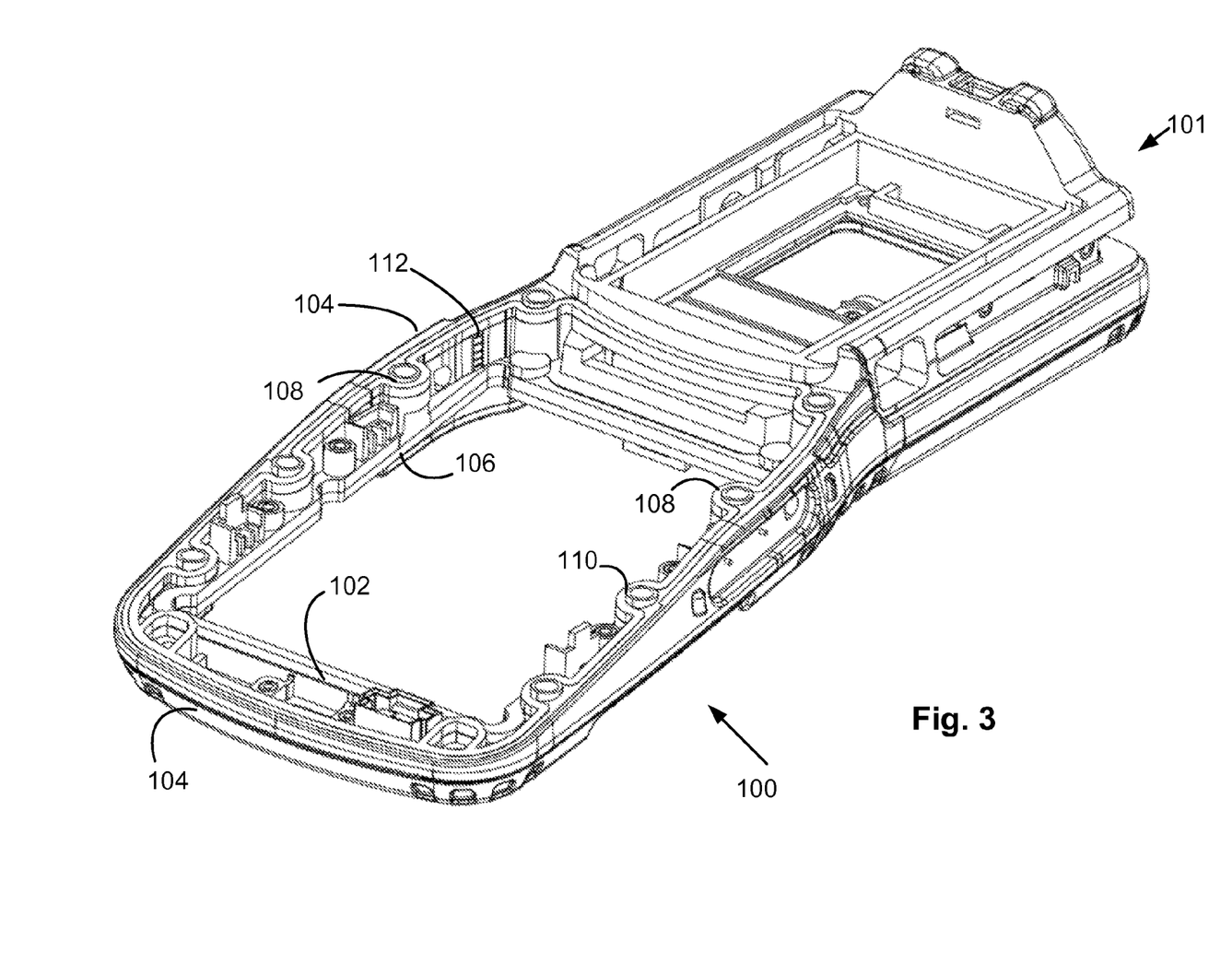
FIG. 3 is a back perspective view from a top end to a bottom end of the portion of the enclosure of FIG. 2.

FIG. 3 is a back perspective view of the portion 100 in an opposite direct to FIG. 2. There is shown a channel 112 within substrate 102 through which an elastomer may be injected to form the sealing overmoulds 106 and 108 using a common injection point. The channel may be wholly or partially enclosed by the substrate and extend between a first region about the first opening to a second region about the second opening.

In accordance with operations described further herein below, the at least two overmoulds (i.e. at least one exterior overmould and at least one sealing overmould) may be formed using a same tool for an injection moulding apparatus without having to remove the substrate from the tool until the two overmoulds are formed.

Figure 4A:
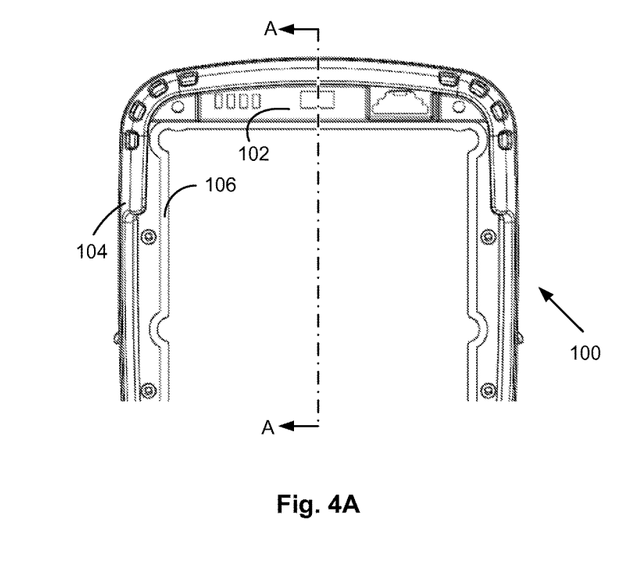
FIG. 4A is a front plan view of a top portion of the enclosure of FIG. 1.
Figure 4B:
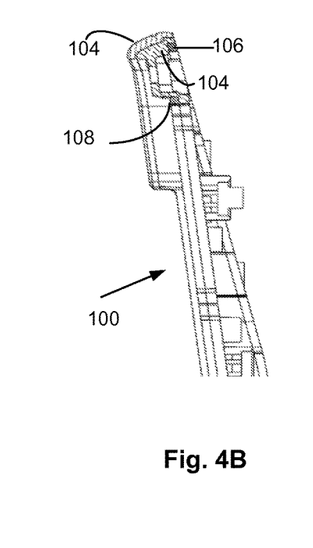
FIG. 4B is a cross-sectional side view of enclosure of FIG. 4A along line A-A.

FIG. 4A is a front plan view of a top portion of the portion 100 of FIG. 1 and FIG. 4B is a cross sectional view thereof along line A-A showing the proximity of the overmoulds 104, 106 and 108 about substrate 102 in the present embodiment. In accordance with certain physical properties of the respective overmould materials (i.e. elastomers) and the substrate material as well as any tooling configuration requirements, the configuration of the substrate, overmoulds and/or operating conditions of the injection moulding apparatus and tools may require adaptation to ensure proper formation of the overmoulds without undue disfigurement of the substrate.

Operational temperatures to apply and form the various overmoulds may necessitate different temperatures for the different materials. One overmould material may require application before another material. Further, following the injection of a first overmould material, the tool carrying the substrate may require manipulation, such as any one or more of rotating, heating or cooling, before injecting a second overmould material. The melting point of a just previously applied overmould material and the application temperature of a to be applied material may overlap such that care (control) may be necessary to minimize disfigurement of a just previously applied overmould.

Figure 5:
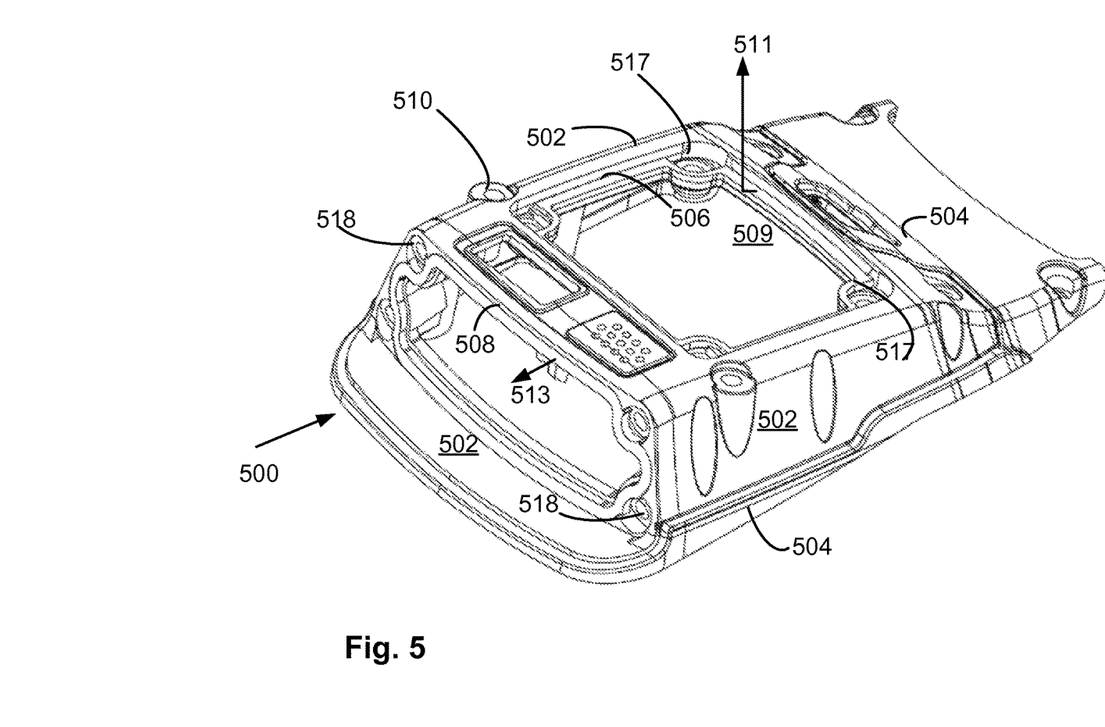
FIG. 5 is a top to bottom back perspective of a partial cover for an opening of the enclosure of FIG. 1, the cover itself having further openings.

FIG. 5 illustrates a perspective view from top to bottom of an enclosure component, namely a partial cover 500. Partial cover 500 comprises a substrate 502 that defines a cavity 509 having a plurality of openings including 511 and 513. Substrate 502, comprising a hard plastic material such as substrate 102, is overmoulded with exterior overmoulding 504 and sealing overmoulding 506 and 508. Substrate 502 comprises screw bosses such as 510 for fastening partial cover 500 to substrate 102. Openings 511 and 513 may be sealingly covered by other components (not shown) which may be screw fastened via respective bosses (e.g. 517 and 518). It will be apparent to those of ordinary skill in the art that other enclosure component shapes and structures may be used to define an enclosure and that not all components need be hard plastics. Some may be of metal, glass, softer plastics (e.g. for keyboard covers) or other materials as need be.

Figure 6A:
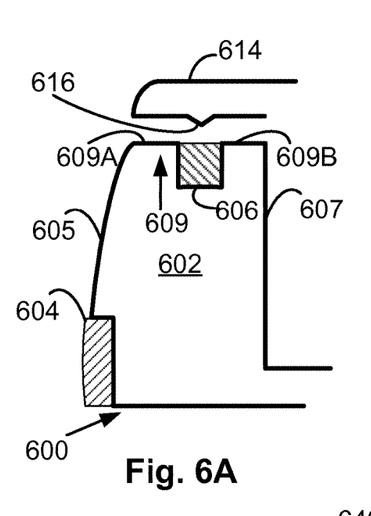
FIGS. 6A, 6B, 6C and 6D are representative cross-sectional views of a portion of an enclosure in accordance with respective embodiments.

FIGS. 6A, 6B, 6C and 6D show cross-sectional views 600, 620A, 620B and 640 of representative substrates 602, 622 and 642 in accordance with respective embodiments to show example locations of exterior overmoulds and sealing overmoulds. In FIG. 6A, substrate 602 comprises exterior side surface 605, interior side surface 607 (defining a surface of a cavity (not shown) and top surface 609 between surfaces 605 and 607. Top surface 609 provides a coupling surface.

Figures 6B, 6C:
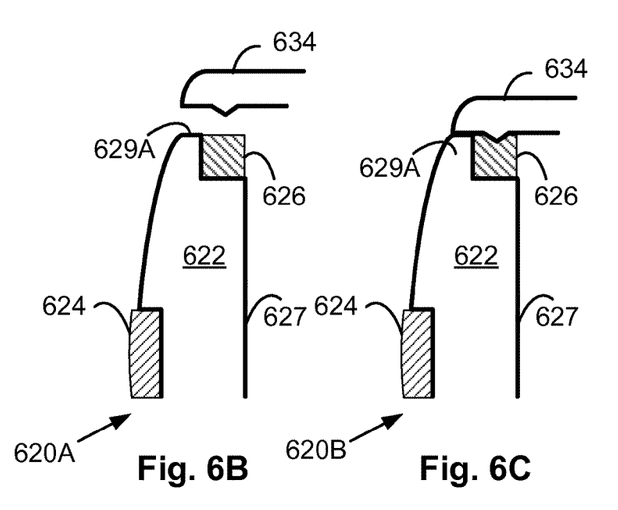

Exterior overmould 604 is located on surface 605. Sealing overmould 606 is located in a channel defined in the coupling surface (top surface 609) by shoulders 609A and 609B. A portion of cover 614 comprises a rib extending therefrom to tightly engage sealing overmould 606 when secured in place. In FIGS. 6B and 6C, substrate 622 comprises exterior side surface 625, interior side surface 627 (defining a surface of a cavity (not shown) and smaller bridging top surface 629 (coupling surface) having a single shoulder 629A. Not all top coupling surfaces may have capacity for a double shouldered channel.

Exterior overmould 624 is located on surface 625. Sealing overmould 626 is located in a partial channel defined in surface 629. A portion of cover 614 comprises a rib extending therefrom to tightly engage sealing overmould 626 as shown in FIG. 6C.

Figure 6D:
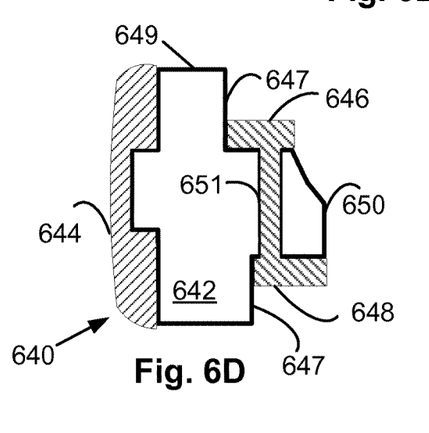

FIG. 6D shows substrate 642 comprising exterior side surface 645, interior side surface 647 (defining a surface of a cavity (not shown) having two openings) and bridging top surface 649. Exterior overmould 644 is located on surface 645. Sealing overmoulds 646 and 648 are located on opposite surfaces of ridge 650 providing a coupling surface from surface 647. Overmoulds 646 and 648 may be connected via an interior channel 651 for facilitating injection from a single injection point.

Figure 7A:
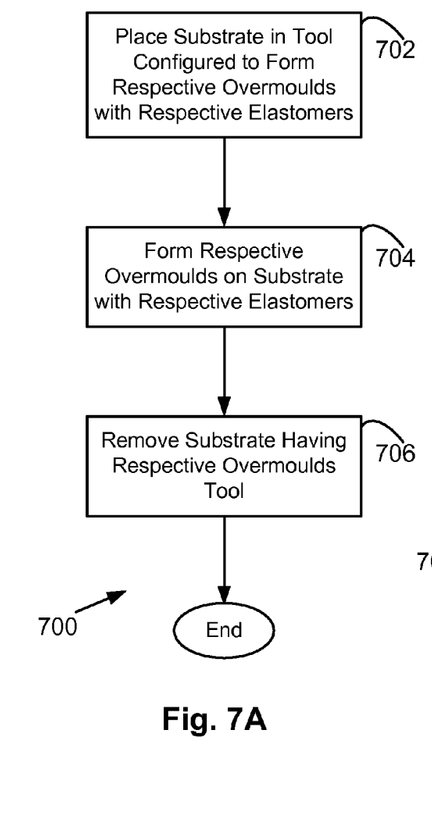
FIGS. 7A and 7B are flowcharts of operations for forming overmoulds in accordance with an embodiment.
Figure 7B:
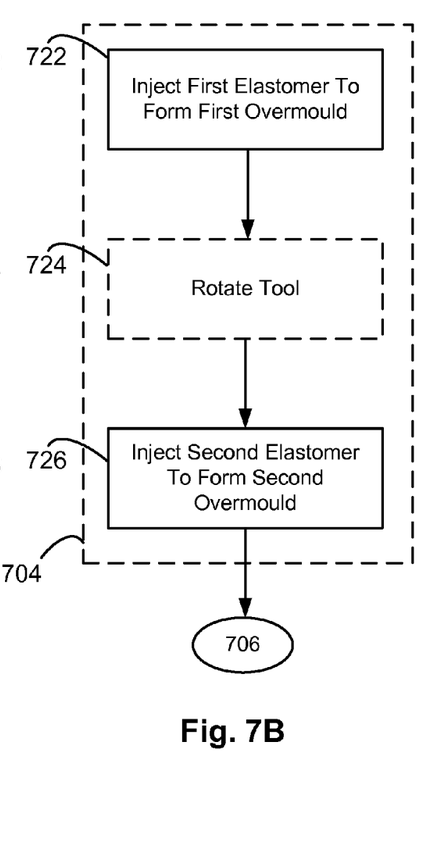

FIGS. 7A and 7B show representative operations for forming overmoulds in a single operation in a single tool. Operations 700 show, at block 702, that the substrate is positioned in a tool configured to form the two or more overmoulds on surfaces of the substrate from respective materials such as elastomers. The respective overmoulds are formed at block 704 in single operation, that is, without removing the substrate from the tool. The substrate having the respective overmoulds is removed from the tool at block 706.

It is understood that the tool may comprise more than one component for supporting the substrate while the overmoulds are formed. Injecting apparatus may be coupled to the tool and heating and/or cooling or manoeuvring means of an injection apparatus may also be used with the tool.

Operations 704 are further detailed in FIG. 7B. At block 722 the first elastomer is injected to form the first overmould. At block 724, optionally the tool having the substrate is manipulated, e.g. the tool is rotated. At block 726, the second elastomer is shot (injected) and the second overmould is formed. Operations continue at block 706.

Though not shown, in some configurations, it may be contemplated that the two overmoulds are formed substantially simultaneously and not serially as shown. For example, two different overmoulds could be shot at once via two "runners" (one for each elastomer).

By overmoulding a seal, the use of separate gaskets, particularly foam gaskets which degrade, may be avoided. Overmoulds with different properties may be formed on a substrate in a single tool in a single operation (i.e. without removing the substrate from the tool until the overmoulds are formed). Overmoulds may follow complex shapes for openings.

A sealing overmould may be used to sealingly couple two enclosure components of a multi-component enclosure, such as for an electronic device. A sealing overmould may be used to sealingly couple the enclosure to other components of the electronic device such as a display screen device, display screen cover, keyboard, electronic connector, etc.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

What is claimed is:

1. An enclosure component of an electronic device, the enclosure component comprising:
   a substrate defining an external surface and a coupling surface for assembly to a component;
   an external overmould comprising a first elastomeric material overmoulded to the external surface of the substrate; and
   a sealing overmould comprising a second elastomeric material overmoulded to the coupling surface of the substrate, the second elastomeric material being a softer material than the first elastomeric material.

2. The enclosure component of claim 1 wherein the external overmould is a wear resistant and/or mechanical shock resistant overmould and wherein the sealing overmould is for coupling to a surface of another component.

3. The enclosure component of claim 1 comprising at least one interior surface at least partially defining a cavity of an enclosure, the cavity having at least one opening to be sealed by at least one other component of a multi-component enclosure.

4. The enclosure component of claim 3 wherein the at least one interior surface defines a cavity having a first opening and a second opening, each opening to be sealed by a respective overmould.

5. The enclosure component of claim 4 wherein the substrate defines a channel, wholly or partially enclosed by said substrate, between a first region about the first opening and a second region about the second opening through which channel the second elastomeric material is injected to form said second overmould.

6. The enclosure component of claim 1 wherein the substrate comprises a polycarbonate plastic material.

7. An enclosure of an electronic device, the enclosure comprising a plurality of enclosure components for assembly to define said enclosure, a first enclosure component of the plurality of enclosure components comprising:
   a substrate defining an external surface and a coupling surface for assembly to a second enclosure component of the plurality of enclosure components;
   an external overmould comprising a first elastomeric material overmoulded to the external surface of the substrate; and
   a sealing overmould comprising a second elastomeric material overmoulded to the coupling surface of the substrate, the sealing overmould creating a seal between the first and the second enclosure components.

8. The enclosure of claim 7 wherein the first elastomeric material and the second elastomeric material have different physical properties.

9. The enclosure of claim 8 wherein a hardness physical property of the first elastomeric material is greater than the hardness physical property of the second elastomeric material.

10. The enclosure of claim 9 wherein the hardness physical property of the first elastomeric material and second elastomeric material respectively measure about 60 Shore A and about 40 Shore A.

* * * * *